United States Patent [19]

Chao et al.

[11] Patent Number: 5,715,102
[45] Date of Patent: Feb. 3, 1998

[54] BEAM SHAPER DEVICE FOR OPTICAL READ/WRITE HEADS

[75] Inventors: Zu-Wen Chao, Shinchu; Tsung-Ming Yang, Keelung; Jau-Jiu Ju, Chutung; Shin-Ter Tsai, Taipei, all of Taiwan

[73] Assignee: Industrial Technology Research Institute, Hsinchu, Taiwan

[21] Appl. No.: 778,350

[22] Filed: Jan. 3, 1997

[30] Foreign Application Priority Data

Sep. 20, 1996 [TW] Taiwan ............... 85111554

[51] Int. Cl.⁶ ............................................. G02B 5/04
[52] U.S. Cl. ..................... 359/833; 359/834; 359/669
[58] Field of Search ............................... 359/669, 831, 359/833, 834, 837, 857

[56] References Cited

U.S. PATENT DOCUMENTS

| | | | |
|---|---|---|---|
| 4,525,034 | 6/1985 | Simmons | 359/834 |
| 4,623,225 | 11/1986 | Forkner | 359/834 |
| 4,759,616 | 7/1988 | Marchant | 359/837 |
| 4,904,068 | 2/1990 | Tatsuno et al. | 359/669 |
| 4,929,067 | 5/1990 | Sander | 359/834 |
| 4,978,199 | 12/1990 | Mukai et al. | 359/857 |
| 5,013,136 | 5/1991 | Whitehead et al. | 359/834 |

*Primary Examiner*—Ricky D. Shafer
*Attorney, Agent, or Firm*—Cushman Darby & Cushman IP Group of Pillsbury Madison & Sutro LLP

[57] ABSTRACT

A beam shaper device for an optical read/write head on an optical disc drive is provided. This beam shaper device is particularly useful for shaping a laser beam originally emitted with an elliptical cross section, into having a substantially circular cross section. The beam shaper device includes only one prism and one plane mirror. The shape of the prism and the orientation of the plane mirror are specifically devised in such a way as to allow the output beam shaper device to have a circular cross section and to have its propagation axis orthogonal to that of the input laser beam.

5 Claims, 4 Drawing Sheets

BEAM SHAPER DEVICE FOR OPTICAL READ/WRITE HEADS

BACKGROUND OF THE INVENTION

1. Field of the Invention

This invention relates in general to optical read/write heads for optical disc drives, and more particularly, to a beam shaper device which is mounted on an optical read/write head for shaping a laser beam originally emitted with an elliptical cross section into a substantially circular cross section.

2. Description of Related Art

On optical disc drives, lasers produced by laser diodes are customarily used for the read/write operation of data on optical discs. The laser beam generated by most laser diodes is elliptical in cross section (hereinafter in this specification, the notion [a*b] will be used to denote the elliptical cross section of a laser beam, in which a designates the length of the major axis of the elliptical cross section, and b designates that of the minor axis of the same). The ratio a/b is inherently 3:1 for most laser diodes. When projected onto the optical disc, the illuminated area on the data surface of the optical disc will be correspondingly an elliptical spot. The two longer opposite end portions of the elliptical spot could fall on neighboring data tracks, thus causing undesired effects such as cross talk or jitters, which will adversely affect the reliability of the data being read from the optical disc.

A solution to the foregoing problem is to provide a so-called beam shaper device on the optical read/write head, which is capable of transforming the laser beam into substantially a circular cross section. Two conventional types of beam shaper devices are available: one-prism and two-prism. These two conventional types of beam shaper devices will be described in detail in the following with reference to FIG. 1 and FIG. 2 respectively.

Referring to FIG. 1, there is shown a schematic diagram of a conventional one-prism type of beam shaper device, which includes a single prism 11 having a refractive index of n. Assume the input laser beam 11 has an [a*b] elliptical cross section. If the incident plane of the prism 11 for the input laser beam is oriented in such a manner as to let the incident angle θ be exactly $\theta = \tan^{-1}(n)$, then the emerging laser beam from the prism 11 can be transformed into having an [a*n–b] elliptical cross section. A mirror 12 is subsequently used to reflect the emerging laser beam to a direction perpendicular to the propagation axis of the input laser beam 14. The reflected laser beam is then focused by a convex lens 13 onto the optical disc (not shown).

The foregoing beam shaper device has the benefits of low manufacturing cost and compactness due to its simplicity in the optical system configuration. However, since as mentioned earlier a/b is 3:1 for most laser diodes, the prism 11 should have its refractive index nearly equal to 3 so as to allow a near true circular cross section for the emerging laser beam. However, most transparent materials such as glass that are used to make the prism 11 have an refractive index less than 2. The illuminated spot on the laser diode is therefore still an elliptical spot which only has the longer axis slightly shortened.

Referring next to FIG. 2, there is shown a schematic diagram of a conventional two-prism type of beam shaper device, which includes two prisms 21, 22. Both of the two prisms 21, 22 have an refractive index of n.

Assume the input laser beam has an [a*b] elliptical cross section. If the two prisms 21, 22 are oriented in such a manner as to let the incident angle $\theta_1$ of the input laser beam on the first prism 21 to be exactly $\theta_1 = \tan^{-1}(n)$, and correspondingly let the incident angle $\theta_2$ of the emerging laser beam on the second prism 22 to be exactly $\theta_1 = \tan^{-1}(n)$. This allows the emerging laser beam from the second prism 22 to be transformed into having an [a*n²·b] elliptical cross section. A mirror 23 is subsequently used to reflect the emerging laser beam to a direction perpendicular to the propagation axis of the input laser beam. The reflected laser beam is then focused by a convex lens 24 onto the optical disc (not shown).

In the foregoing two-prism type of beam shaper device, a true circular cross section for the laser beam requires that $n^2 = 3$, or $n = 1.7$. Since there are readily available a great variety of transparent materials with an refractive index around n=1.7, this two-prism type of beam shaper device is much easier to manufacture. However, due to its more complex structure, this two-prism type of beam shaper device has the drawbacks of high manufacturing cost and less compactness.

The foregoing two types of beam shaper devices each have its own benefits which can not be achieved by the other. There exists a need for a new type of beam shaper device which has all the benefits that are respectively offered by the foregoing two conventional types.

SUMMARY OF THE INVENTION

It is therefore a primary objective of the present invention to provide a beam shaper device which can be constructed with a prism made of readily available transparent material having a low refractive index.

It is another objective of the present invention to provide a beam shaper device which can be manufactured with low cost.

It is still another objective of the present invention to provide a beam shaper device which can be constructed with compactness.

In accordance with the foregoing and other objectives of the present invention, a new and improved beam shaper device is provided.

The beam shaper device includes only one prism made of a transparent material having an refractive index of n. Further, the prism is triangular in cross section having three planes: a first plane for receiving the input laser beam by an incident angle of $\tan^{-1}(n)$; a second plane coated with a reflective layer for reflecting light on the inside of the prism; and a third plane for light output. Specifically, the angle between the first plane and the third plane is designed to be substantially equal to:

$$\tan^{-1}\left(\frac{1}{n}\right)$$

and the angle between the second plane and the third plane is designed to be substantially equal to:

$$\pi - \frac{3}{2} \cdot \tan^{-1}\left(\frac{1}{n}\right)$$

In addition, a plane mirror is oriented by an angle of ½·$\tan^{-1}(n)$ with respect to the first plane of the prism.

Assume the input laser beam has an [a*b] elliptical cross section, the foregoing design allows the output laser beam to be reshaped into having an [a*n²·b] elliptical cross section. Therefore, if the prism is made of a transparent material having a refractive index of $n = (a/b)^{1/2}$, the output laser beam will have a circular cross section. Further, the material having such a low refractive index is easy to obtain. The foregoing beam shaper device includes only one prism is used, so that the size thereof can be made small.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

Figure 3:
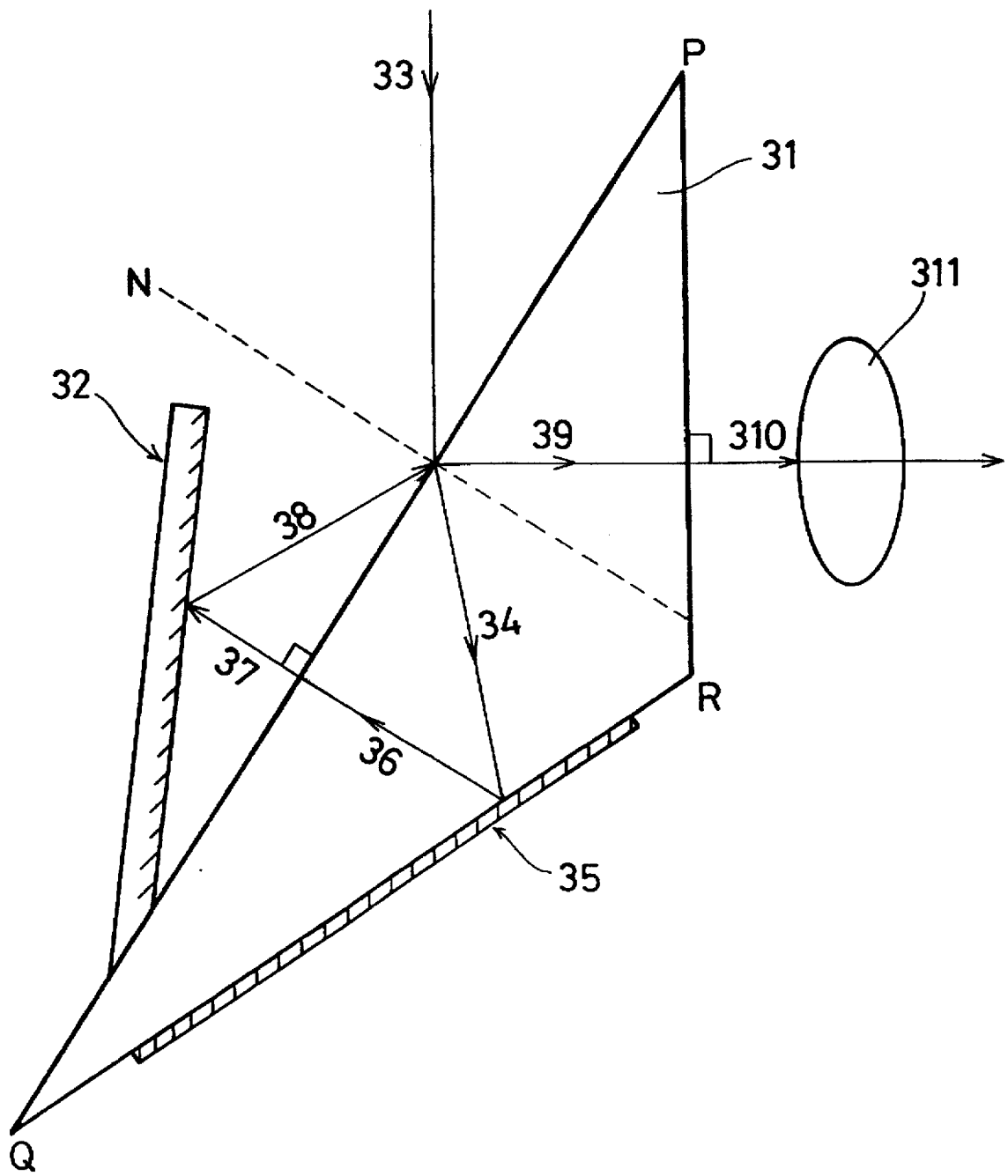
FIG. 3 is a schematic diagram of the beam shaper device according to the present invention.

FIG. 3 is a schematic diagram of the beam shaper device according to the present invention, which is composed of a single prism 31 and a plane mirror 32. The cross section of the prism 31 is an obtuse triangle having three vertices P, Q, and R. Assume that the refractive index of the prism 31 is n and the light propagation medium outside the prism 31 is air (n≈1). An input laser beam 33, which has an [a*b] elliptical cross section, is received by the beam shaper device at one point (designated by O) on the PQ plane. By arranging the incident angle $\theta_1$ to be exactly $\theta_1=\tan^{-1}(n)$, the entire laser beam 33 can be transmitted into the prism 31 with no reflection. Further, The refractive angle $\theta_2$ is related to $\theta_1$ by $\theta_1+\theta_2=90°$. This result can be easily deduced from the Snell's Law by any one skilled in the art of optics and is well known in the art, so that description of the deduction to the result will not be detailed herein. The transmitted light 34 inside the prism 31 is thereby transformed into having an [a*n·b] elliptical cross section.

Propagating onwards inside the prism 31, the laser beam 34 will meet the QR plane which is painted with a reflective coating 35 on the outer surface. The reflected laser beam 36 from the QR plane still has an [a*n·b] elliptical cross section.

After being reflected, the laser beam 36 will meet the PQ plane. This optical system is specifically designed in such a way that the propagation axis of the laser beam 36 is orthogonal to the PQ plane, i.e., the incident angle of the laser beam 36 on the PQ plane is 0°. How the result of orthogonal incident of the laser beam 36 on the PQ plane is achieved will be described later with reference to FIG. 4. The orthogonal incidence of the laser beam 36 on the PQ plane allows the exiting laser beam 37 to the outside of the prism 31 to be subjected to no refraction. Thus, the exiting laser beam 37 still has an [a*n·b] elliptical cross section.

Further, the laser beam 37 will be reflected by the plane mirror 32 back to the PQ plane of the prism 31. The plane mirror 32 is oriented in such a way as to direct the reflected laser beam 38 therefrom to strike the PQ plane at the point O by an incident angle of $\tan^{-1}(n)$. This incident angle allows the laser beam 38 to be transmitted into the prism 31 completely with no reflection. In this case, the sum of the incident angle and the refractive angle is 90°.

Inside the prism 31, the refracted laser beam 39 is further transformed by the factor of n into having an [a*n²·b] elliptical cross section. Subsequently, the laser beam 39 will meet the PR plane and exit the prism 31 therefrom. This optical system is specifically designed in such a way as to allow the propagation axis of the laser beam 39 to be exactly orthogonal to the PR plane, i.e., the incident angle of the laser beam 39 on the PQ plane is 0°. How the result of orthogonal incident of the laser beam 39 on the PR plane is achieved will be described later with reference to FIG. 4. The orthogonal incidence of the laser beam 39 on the PR plane allows the exiting laser beam 310 to the outside of the prism 31 to be subjected to no refraction. Thus, the exiting laser beam 310 still has an [a*n²·b] elliptical cross section. Next, the laser beam 310 is focused by a convex lens 311 onto the optical disc (not shown).

On the overall optical path, the laser beam refracts at the point O for two times, both by an incident angle of $\tan^{-1}(n)$, which allows the sum of the incident angle and the refractive angle to be exactly 90°. This allows the exiting laser beam 310 to be orthogonal in propagation axis to the input laser beam 33.

Figure 4:
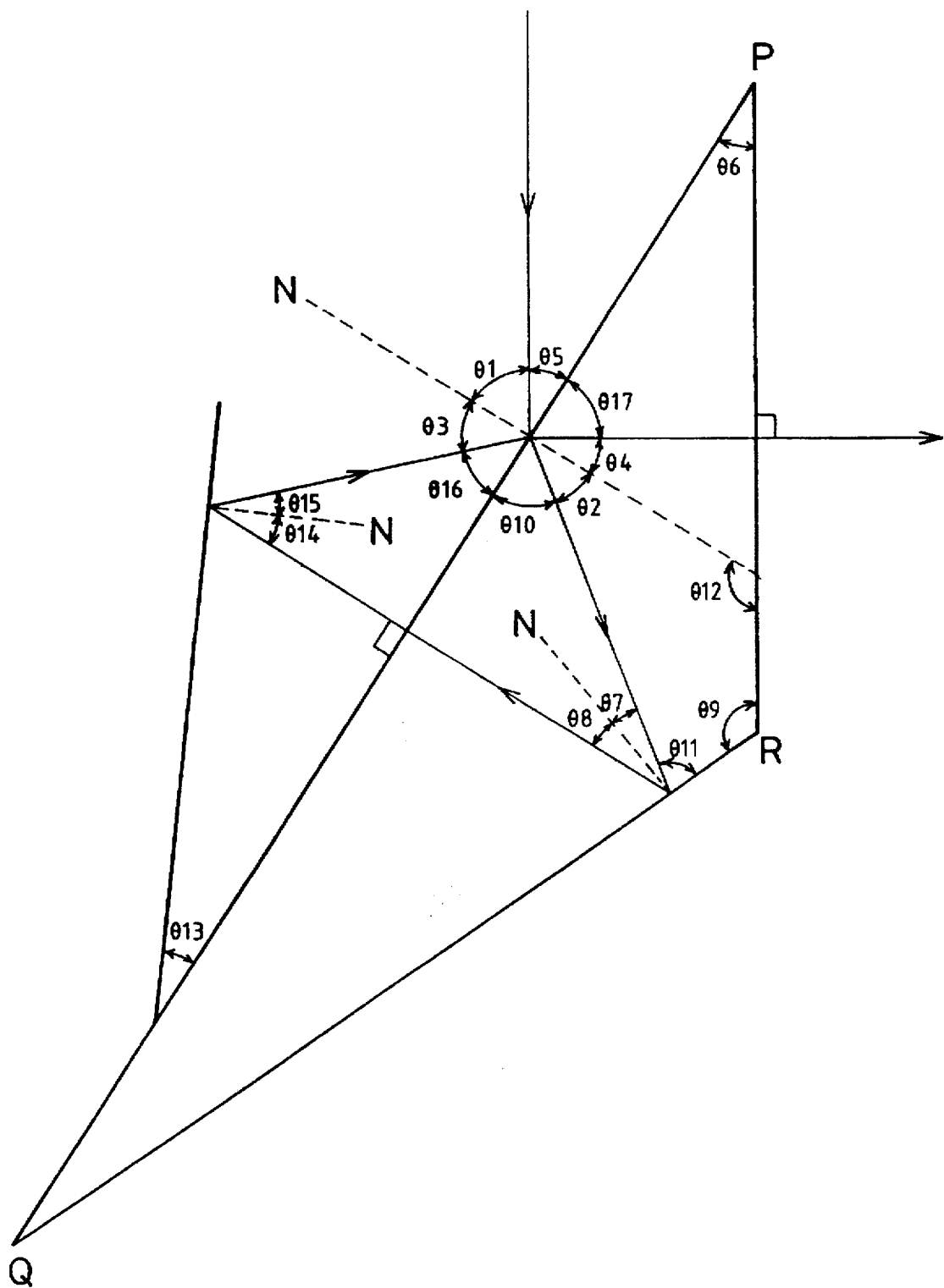
FIG. 4 is a schematic diagram used to depict the geometry of the light transmission path in the beam shaper device of FIG. 3.

FIG. 4 is a schematic diagram used to depict the scheme for devising the optical path for the laser beam. Assume ∠QPR is $\theta_6$ and ∠PRQ is $\theta_9$, and the angle between the plane mirror 32 and the PQ plane of the prism 31 is $\theta_{13}$. From basic optics principles, it can be deduced that, if the incident light is entirely transmitted without any reflection, the sum of the incident angle $\theta_1$ and the refractive angle $\theta_2$ is exactly 90° and $\theta_1=\tan^{-1}(n)$, $\theta_2=\pi/2-\tan^{-1}(n)$. Further, the following relationships can be obtained:

$$\theta_1 + \theta_5 = \frac{\pi}{2} \quad (1)$$

$$\theta_5 + \theta_{17} = \frac{\pi}{2} \quad (2)$$

$$\theta_6 + \theta_{17} = \frac{\pi}{2} \quad (3)$$

$$\theta_2 + \theta_{10} = \frac{\pi}{2} \quad (4)$$

$$\theta_7 + \theta_8 + \theta_{10} = \frac{\pi}{2} \quad (5)$$

$$\theta_7 = \theta_8 \quad (6)$$

$$\theta_7 + \theta_{11} = \frac{\pi}{2} \quad (7)$$

$$\theta_4 + \theta_6 + \theta_{17} = \theta_{12} \quad (8)$$

$$\theta_2 + \theta_9 + \theta_{11} + \theta_{12} = \frac{\pi}{2} \quad (9)$$

$$\theta_{13} = \theta_{14} \quad (10)$$

$$\theta_{14} = \theta_{15} \quad (11)$$

$$\theta_3 + \theta_{16} = \frac{\pi}{2} \quad (12)$$

$$\theta_{14} + \theta_{15} + \theta_{16} = \frac{\pi}{2} \quad (13)$$

Deduced from Eqs. (1) through (3), the following relationship can be determined:

$$\theta_6 = \theta_2 = \frac{\pi}{2} - \tan^{-1}(n) = \tan^{-1}\left(\frac{1}{n}\right) \quad (14)$$

Deduced from Eqs. (4) through (9), the following relationship can be determined:

$$\theta_9 = \pi - \frac{3}{2} \cdot \theta_2 = \pi - \frac{3}{2} \cdot \tan^{-1}\left(\frac{1}{n}\right) \quad (15)$$

Deduced from Eqs. (10) through (13), the following relationship can be determined:

$$\theta_{13} = \frac{1}{2} \cdot \theta_1 = \frac{1}{2} \cdot \tan^{-1}(n) \quad (16)$$

In conclusion, in order to achieve the foregoing result, the prism 31 and the plane mirror 32 should be devised in the following manner:

(1) for the prism 31:

$$\angle QPR = \theta_6 = \tan^{-1}\left(\frac{1}{n}\right)$$

$$\angle QRP = \theta_9 = \pi - \frac{3}{2} \cdot \tan^{-1}\left(\frac{1}{n}\right)$$

$\theta_5 = \theta_6$ (which indicates that the PR plane should be in parallel to the propagation axis of the input laser beam 33).

(2) for the orientation of the plane mirror 32:

$$\theta_{13} = \frac{1}{2} \cdot \tan^{-1}(n)$$

Under these design particulars, the input laser beam, which has an [a*b] elliptical cross section, can be transformed into the output laser beam 311 having an [a*n²·b] cross section. By proper selection of material having a refractive index of $n = (a/b)^{1/2}$ for the prism 31, the output laser beam 311 can have a circular cross section. For most cases, this will be $n = (3/1)^{1/2} = 1.7$. Further, the output laser beam 311 is orthogonal in its propagation axis to that of the input laser beam 33 without the use of any rotatable mirrors.

Figure 1:
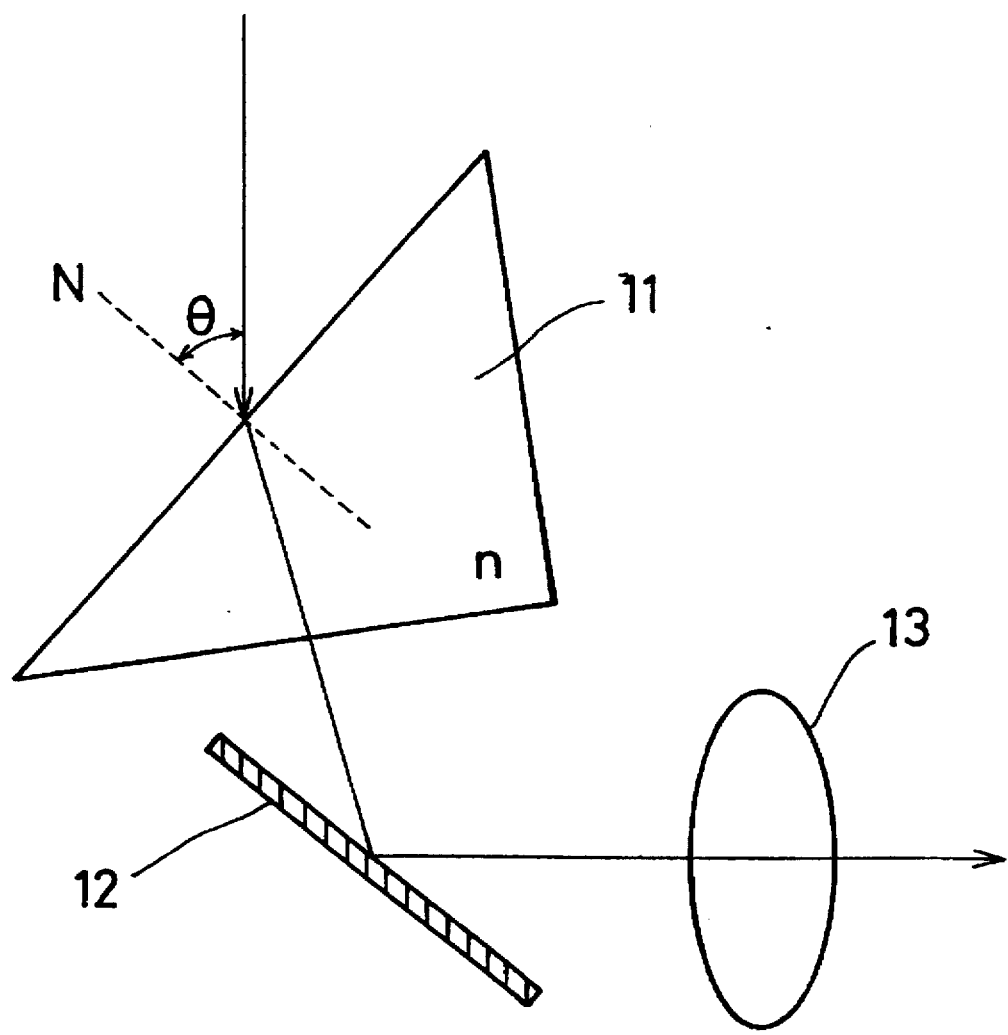
FIG. 1 is a schematic diagram of a conventional one-prism type of beam shaper device.
Figure 2:
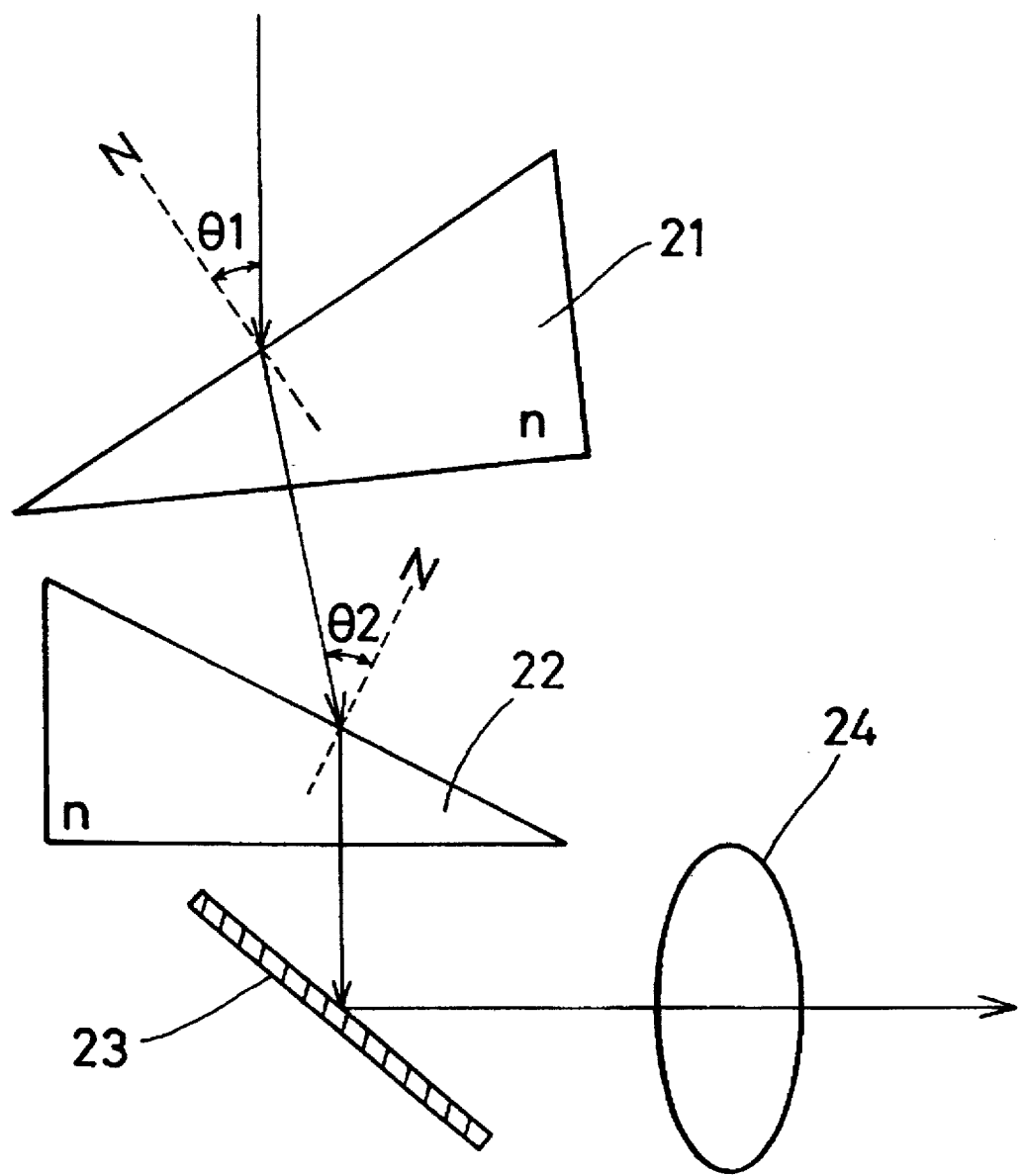
FIG. 2 is a schematic diagram of a conventional two-prism type of beam shaper device.

The following table summarizes the advantages of the invention over the prior art beam shaper devices of FIG. 1 and FIG. 2.

|  | Prior art of FIG. 1 | Prior art of FIG. 2 | This invention |
| --- | --- | --- | --- |
| Number of prisms | 1 | 2 | 1 |
| Number of plane mirrors | 0 | 0 | 1 |
| Number of rotatable plane mirrors | 1 | 1 | 0 |
| Space for the rotatable parts | 5*5*5 | 5*5*5 | 4.98*7.21*5 |
| Cross Section of Input laser beam | [a*b] | [a*b] | [a*b] |
| Cross section of output laser beam | [a*n · b] | [a*n² · b] | [a*n² · b] |
| Availability of material for making the prism(s) | Difficult | Easy | Easy |
| Size | Small | Large | Small |
| Manufacturing Cost | Low | High | Low |

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

What is claimed is:

1. A beam shaper device for reshaping the cross section of an input laser beam, which comprises:

(a) a prism made of a transparent material having an refractive index of n, said prism having a triangular cross section including:

a first plane for receiving the input laser beam by an incident angle of $\tan^{-1}(n)$;

a second plane coated with a reflective layer for reflecting light on the inside of said prism; and a third plane for light output;

wherein the angle between said first plane and said third plane is:

$$\tan^{-1}\left(\frac{1}{n}\right)$$

and the angle between said second plane and said third plane is:

$$\pi - \frac{3}{2} \cdot \tan^{-1}\left(\frac{1}{n}\right)$$

(b) a plane mirror oriented by an angle of $\frac{1}{2}\tan^{-1}(n)$ with respect to said first plane of said prism.

2. The beam shaper device of claim 1, wherein the input laser beam has an elliptical cross section.

3. The beam shaper device of claim 1, wherein said prism is made of a transparent material having an refractive index of $n = (a/b)^{1/2}$, which allows the output laser beam to have a circular cross section.

4. The beam shaper device of claim 3, wherein said third plane is parallel to the input laser beam.

5. The beam shaper device of claim 4, wherein the propagation axis of the output laser beam is orthogonal to the propagation axis of the input laser beam.

* * * * *